Aug. 30, 1966    K. G. BRUCKNER    3,269,271
MOUNTING AND CENTERING DEVICE FOR MILLING CUTTERS
Filed June 25, 1964

INVENTOR.
KARL BRUCKNER
BY
ATTORNEY

United States Patent Office 3,269,271
Patented August 30, 1966

3,269,271
MOUNTING AND CENTERING DEVICE FOR MILLING CUTTERS
Karl Georg Bruckner, Haffnerstrasse 7, Stuttgart-Feuerbach, Germany
Filed June 25, 1964, Ser. No. 378,023
2 Claims. (Cl. 90—11)

This invention relates to machine tools, and more particularly to mounting and centering devices for milling cutters and the like.

The present application is a continuation-in-part of this inventor's application, Serial No. 133,978, entitled, "Mounting and Centering Device for Milling Cutters," filed August 25, 1961, now Patent No. 3,138,997. As fully described in that application, the present invention provides a unique draw-bar arrangement for universally supporting cutter heads of various sizes and shapes upon various forms of milling machine spindles. It accomplishes these objects in an extremely effective manner through the use of a specific form of mounting collar placed intermediate the cutter to be attached to the spindle and the end of the spindle itself, in combination with the use of draw-bar and stud arrangement adapted to co-act in a specific manner with a counterbored area in the outer face of a milling cutter. (The outer face in this instance being the designation attached to that face of the cutter away from the end of the spindle; the term "axial" will be used to denote that direction substantially coincidental with the axis of the spindle. Inner face, of course, refers to a surface facing generally in the direction of the spindle, towards the machine tool.)

It is an object of this invention to provide a draw-bar type universal mounting arangement for supoprting a milling machine cutter at a distance from the end of the spindle of the machine tool.

It is further an object of this invention to provide a unique system including a draw-bar, a mounting collar, an intermediate member and a draw-bar stud in a milling tool support arrangement whereby the milling tool may be supported at substantially any desired distance from the spindle (within design limits) without the requirement of any other fastening, securing, clamping or tensioning means.

It is still further an object of this invention to provide a draw-bar type milling tool support system including a mounting collar and an intermediate member which may be formed in suitable lengths so that any desired spacing may be obtained between the milling cutter and the spindle simply by placing a suitable intermediate member between the cutter and spindle in any particular set-up.

It is another object of this invention to provide a draw-bar milling tool attachment including a mounting coliar for universally supporting milling tool cutters at a specific distance from a spindle whereby tightening of the draw-bar transmits a clamping force along the entire length of the cutter, collar and spindle assembly for providing a clamping action which prevents transverse or radial rocking motion of the cutter thus supported in relation to the tool spindle even in the presence of heavy radial loads and other vibration inducing forces.

As will be apparent from the preceding statement of objectives, the invention forming the subject matter of this application is directed to the problem of universally mounting milling cutters by means of a draw-bar arrangement at any desired spaced interval from the spindle end point. The application identified above of which this is a continuation-in-part was concerned with mounting a cutter *adjacent* the spindle of a milling machine by means including a one piece mounting collar and a draw-bar stud. The collar was of a specific configuration whereby a counterbored inner face of the collar furnished the sole centering means for the collar relative to the tool spindle. Furthermore, the draw-bar stud was designed to seat within a counterbored outer end face of the milling cutter and to threadably engage at its inner end the draw-bar which extended through the spindle along its centerline, this stud and draw-bar furnishing the sole tensioning means for the cutter support assembly.

The present invention furnishes the means whereby virtually all of the advantages of the foregoing assembly are preserved while allowing the cutter to be supported at a desired distance from the spindle end rather than abutting the relatively thin collar member shown in the earlier case. Thus is accomplished, as will be more specifically described below, by using one or more intermediate members of various lengths between the collar mounted to the spindle and the cutter element of the tool. The stud, of course, which engages the draw-bar, is appropriately lengthened to accommodate the intermediate piece or pieces, and fits snugly within bored apertures in the pieces to firmly support in axial alignment the collar, intermediate extension(s) and the cutter.

In the drawings accompanying this specification and forming a part thereof, several embodiments of the invention are illustrated diagrammatically by way of example.

Figure 1:
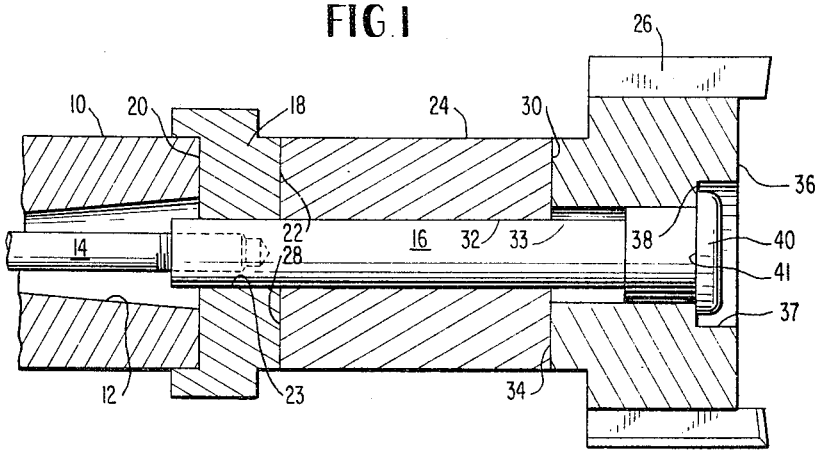
FIGURE 1 is a longitudinal sectional view of a draw-bar spindle collar and cutter assembly incorporating the present invention.

Referring now to FIGURE 1 of the drawings, a machine tool spindle 10 is provided with a central bore 12 through which centrally extends a conventional draw-bar 14. The draw-bar 14 is threadably attached to a stud element 16 which is in axial alignment with the draw-bar 14.

A mounting collar 18 is provided with a centrally counterbored inner face 20 which abuts the outer end face of the spindle 10, the end face of the spindle 10 and the counterbored face 20 of the collar both extending perpendicularly to the spindle longitudinal axis. The collar 18 is furthermore provided with a forward face 22 parallel with its inner face 20 and is centrally bored at 23. It will be noted that the minimum outer diameter of the collar 18 is no less than the outer diameter of spindle member 10, and that the counterbored inner area of collar 18 fits snugly against the end of spindle 10.

Since it is often desirable, and even necessary in some operations, to mount the cutter of a milling tool at some distance from the spindle end, such as when it is desired to shape the interior of a housing, the present invention provides an intermediate member 24 between the cutter 26 and the collar element 18. The intermediate member 24, which may be provided in various lengths to adjust the spacing between the collar 18 and cutter 26, has an inner and outer face 28, 30, respectively; is provided with a central bore hole 32, and has an outer diameter no less than the minimum outer diameter of the collar 18 or of the outer diameter of the spindle 10. Of course, more than one intermediate member may be used in a set-up.

The cutter 26 may be any variety or form of standard milling cutter provided with a central bored aperture 33, an inner planar surface 34 and an outer face 36 counterbored at 37 so as to provide a shoulder area 38 extending parallel to the inner and outer planar surfaces 34, 36 of the cutter.

Disposed within the central bore holes in collar 18, intermediate member 24 and cutter 26, is an internally threaded stud 16, which is threadably mounted at its inner end to the draw-bar 14. The outer end of the stud 16 is enlarged at 40 so as to engage the shoulder 38 of cutter 26 when the assembly is tensioned by the draw-bar 14. The inner face 41 of the enlargement engages surface 38 of the cutter member 26 when the collar, intermediate member and cutter are assembled for operation. The stud 16 fits closely within the aligned bore holes of the collar intermediate member and cutter, and serves as the sole means for resisting transverse shear loads imposed on the set-up.

Figure 2:
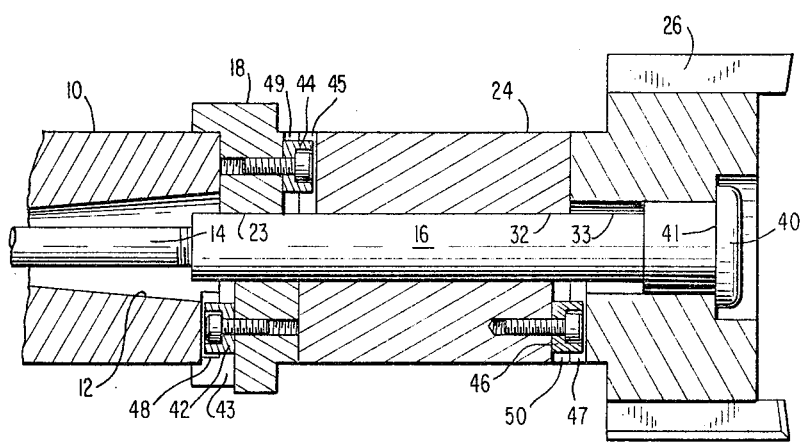
FIGURE 2 is a view of FIGURE 1 showing the driving and aligning key details.

As will be clearly apparent from the drawings, the intermediate member 24 is a relatively massive and solid member, which, in combination with the central stud 16, is fully capable of resisting compression loads induced therein by radial faces acting on cutter 26. As illustrated in FIG. 2, there is driving key 61 for transmitting torque between the head of the spindle 55 and the collar 57, and the radial keys 62 transmit torque beyond the collar 57 down to the intermediate cutter 24 and the cutter 26. These torque transmitting keys, driving key 61 and radial keys 62, serve as longitudinally disposed, torque transmitting components. In fact, it will be apparent from the drawings that the transverse cross section area of the bore holes in the collar and intermediate member is considerably smaller than the transverse cross sectional areas of the entire collar and intermediate member and usually will not amount to more than one-half the entire transverse cross-sectional area of the collar and intermediate member. Such a structure is desirably rigid and resists vibration during operation of the tool.

In FIGURE 2 there is illustrated a driving arrangement for transmitting torque from the spindle to the cutter comprising multiple keys between the spindle head, collar, intermediate member, and cutter. Thus, keys 42, 44 and 46 are provided between spindle 10 and the three respective members of the set-up. The keys 42, 44 and 46 respectively engage slots or keyways 43, 45 and 47 and in the collar, intermediate member and cutter and slots 48, 49 and 50 in the spindle, collar, and intermediate member.

Figure 3:
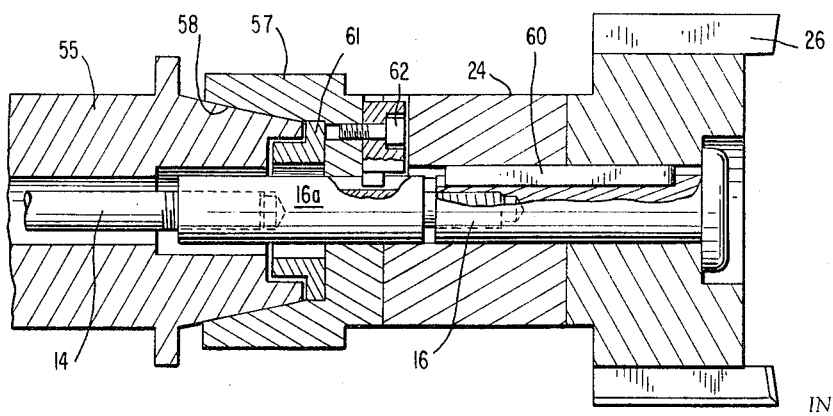
FIGURE 3 is a longitudinal sectional view of an alternate cutter set-up incorporating the invention.

In FIGURE 3, a tapered spindle 55 is illustrated with a collar 57 having a central tapered counterbore 58 in its inner face which accommodates the tapered diameter of the spindle 55. In this instance there is also illustrated the use of a single longitudinally extending driving key 60 which engages suitable keyways in the collar, intermediate member and cutter head. Such a driving arrangement is, of course, an alternative to the multiple key arrangement illustrated in FIGURE 2.

In operation, it will be readily apparent that the sole tensioning means for the entire cutter set-up is the drawbar and stud combination. Radial forces acting on the cutter are effectively resisted by the longitudinally extending stud member 16 and the counterbored inner face 20 of the collar 18 which engages the end of the spindle 10. Bending loads resulting from transverse cutter forces are resisted by the large diameter planar faces of the collar 18, the intermediate member 24 and the inner face 34 of the tool which are designed with sufficient area so as to present adequate moment arms tending to resist cutting load induced forces. Thus, the entire assembly is proportioned in such a manner that radial loads and stresses imposed by bending forces are resisted to a degree approximating the situation where the cutter is mounted directly to the spindle.

Of course, the advantage of the entire system is that a universal mounting is provided which may accommodate a wide variety of cutter sizes without the need for the cutter bore precisely fitting the outside diameter of the tool spindle. All of these advantages have been fully described in the parent case identified at the beginning of the specification.

I wish it to be understood that I do not desire to be limited to the details of construction, design and operation shown and described except as indicated in the following claims, as numerous modifications involving no departure from the spirit of the invention nor any sacrifice of the advantages thereof will readily suggest themselves to persons skilled in this art.

I claim:
1. In a milling machine accommodating one of a plurality of cutter heads varying widely in diameter and size for engagement with either a cylindrical or conical rotating spindle, the axially joined, rigidly stable combination of an elongated, axially bored spindle having an end face perpendicular to the face perpendicular to the spindle axis; and axially bored mounting collar having inner and outer faces parallel to each other and perpendicular to the spindle axis, said collar having a counterbored inner face whose configuration is substantially that of the spindle end portion, with the said counterbored inner face of said collar receiving a predetermined length of the spindle end portion, in close fitting engagement, the said counterbored inner face of said collar when engaged with the spindle end constituting the sole means on said collar for centering said collar on said spindle; a centrally bored, intermediate member having planar inner and outer faces disposed with its inner face abutting the said outer face of said collar; an axially bore cutter having a planar inner face perpendicular to the axis of said spindle and disposed in abutting relationship against the outer face of said intermediate member, and having a counterbored outer end face providing a radial shoulder portion; a draw-bar extending along substantially the entire length of the center bore of said spindle, said draw-bar being threaded at its outer end; and internally threaded stud closely fitted within the axial bores of the said collar, intermediate member, and cutter, said stud having an enlarged outer end portion engaging the said shoulder provided by the said counterbore in the said outer end face of said cutter, and at its inner end receiving the threaded outer end of said draw-bar, said stud constituting the sole means for maintaining said collar, intermediate member and cutter in axial alignment, and for resisting transverse shearing loads imposed upon the spindle, collar, intermediate member and cutter assembly, said stud and draw-bar constituting the sole tensioning means for clamping together the said cutter, intermediate member, collar and spindle; and suitable means for transmitting driving torque forces between the said spindle, collar, intermediate member and cutter.

2. The structure recited in claim 1 wherein the transverse cross sectional area of said bores in said collar and intermediate member elements is not greater than one-half the entire transverse cross sectional areas of each of the said collar and elements themselves.

References Cited by the Examiner

UNITED STATES PATENTS 2,361,324  10/1944  Severson _____ 90—11.1
2,374,919  5/1945   Bruseth _____ 90—11.1

FOREIGN PATENTS 247,281  12/1947  Switzerland.

ANDREW R. JUHASZ, *Primary Examiner.*

WILLIAM W. DYER, JR., *Examiner.*

L. VLACHOS, *Assistant Examiner.*